US010262074B2

(12) United States Patent
Wen et al.

(10) Patent No.: US 10,262,074 B2
(45) Date of Patent: Apr. 16, 2019

(54) METHOD AND DEVICE FOR OFFLINE WEBPAGE BROWSING, AND COMPUTER STORAGE MEDIUM

(71) Applicant: TENCENT TECHNOLOGY (SHENZHEN) COMPANY LIMITED, Shenzhen, Guangdong (CN)

(72) Inventors: Yanjie Wen, Shenzhen (CN); Yi Zhao, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 566 days.

(21) Appl. No.: 14/564,636

(22) Filed: Dec. 9, 2014

(65) Prior Publication Data
US 2015/0095765 A1 Apr. 2, 2015

Related U.S. Application Data

(63) Continuation of application No. PCT/CN2013/076796, filed on Jun. 5, 2013.

(30) Foreign Application Priority Data

Jun. 11, 2012 (CN) .......................... 2012 1 0190621

(51) Int. Cl.
G06F 17/00 (2006.01)
G06F 17/30 (2006.01)

(52) U.S. Cl.
CPC .. *G06F 17/30902* (2013.01); *G06F 17/30887* (2013.01); *G06F 17/3089* (2013.01); *G06F 17/30899* (2013.01)

(58) Field of Classification Search
CPC ....................... G06F 17/3089; G06F 17/30899
See application file for complete search history.

(56) References Cited

U.S. PATENT DOCUMENTS 8,380,710 B1* 2/2013 Finne ................. G06F 17/3053
707/723
8,656,265 B1* 2/2014 Paulin ............... G06F 17/30899
715/205
(Continued)

FOREIGN PATENT DOCUMENTS

CN 1846212 A 10/2006
CN 101690128 A 3/2010
(Continued)

OTHER PUBLICATIONS

International Search Report in international application No. PCT/CN2013/076796, dated Sep. 12, 2013.
(Continued)

Primary Examiner — Andrew R McIntosh
(74) Attorney, Agent, or Firm — Oppedahl Patent Law Firm LLC

(57) ABSTRACT

The disclosure relates to the field of IOS terminals, and provides a method and device for offline webpage browsing and a computer storage medium, wherein the method includes: a Uniform Resource Locator (URL) input by a user is received; when an instruction for adding the URL is received, storing the URL into a preset offline browsing list, downloading a webpage resource file of a webpage corresponding to the URL into a specified storage position, and compressing the downloaded webpage resource file into an executable document; and in an offline state, a URL in the offline browsing list is received and an executable document corresponding to the selected URL is loaded so as to implement offline webpage browsing. The problems existing in the prior art that a webpage resource file is incompletely loaded and the loading efficiency is low may be solved effectively by the disclosure.

15 Claims, 3 Drawing Sheets

(56) References Cited

U.S. PATENT DOCUMENTS

| | | | |
|---|---|---|---|
| 2002/0065800 A1* | 5/2002 | Morlitz | G06F 17/30902 |
| 2005/0050172 A1 | 3/2005 | Redpath | |
| 2009/0006308 A1 | 1/2009 | Fonsen | |
| 2009/0158140 A1* | 6/2009 | Bauchot | G06Q 30/02 |
| | | | 715/234 |
| 2010/0153489 A1 | 6/2010 | Ito | |
| 2011/0154213 A1* | 6/2011 | Wheatley | G06F 3/0481 |
| | | | 715/738 |
| 2011/0264992 A1* | 10/2011 | Vishria | G06F 17/30887 |
| | | | 715/208 |
| 2013/0104114 A1* | 4/2013 | Reiss | G06F 8/38 |
| | | | 717/170 |

FOREIGN PATENT DOCUMENTS

| | | |
|---|---|---|
| CN | 101997853 A | 3/2011 |
| CN | 102298599 A | 12/2011 |

OTHER PUBLICATIONS

English Translation of the Written Opinion of the International Search Authority in international application No. PCT/CN2013/076796 , dated Sep. 12, 2013.
Notification of the First Office Action of Chinese application No. 201210190621.1 , dated Feb. 6, 2015.

* cited by examiner

METHOD AND DEVICE FOR OFFLINE WEBPAGE BROWSING, AND COMPUTER STORAGE MEDIUM

CROSS-REFERENCE TO RELATED PATENT APPLICATIONS

This is a continuation application of International Patent Application No.: PCT/CN2013/076796, filed on Jun. 5, 2013, which claims priority to Chinese Patent Application No.: 201210190621.1, filed on Jun. 11, 2012, the disclosure of which is incorporated by reference herein in its entirety.

TECHNICAL FIELD

The disclosure relates to the field of IOS-based terminals, and in particular to a method and device for offline webpage browsing based on an IOS platform and a computer storage medium.

BACKGROUND

Most of existing IOS-based terminal devices (such as an iPhone, ipad and the like) may access the Internet wirelessly and browse content thereon. When browsing a webpage, an existing IOS-based terminal device downloads a corresponding webpage resource file by a system control of the IOS-based terminal device, and stores the downloaded webpage resource file dispersively into a folder. In an offline state, the stored webpage resource file is loaded by UIWebView so as to be displayed. However, due to uncontrollability of loading a webpage resource file by UIWebView, when each of dispersive webpage resource files is loaded by UIWebView, an incomplete loading or non-loading of some webpage resource files may occur, resulting in an incompletely-displayed page and affecting user experiences. Moreover, a dispersive storing of a webpage resource file may waste storage space of a system and affect the efficiency of loading the webpage resource file.

SUMMARY

The present disclosure provides a method for offline webpage browsing, so as to solve problems existing in the prior art that a webpage resource file is incompletely loaded and the loading efficiency is low.

The embodiments of the disclosure are implemented as follows. A method for offline webpage browsing, including:
a Uniform Resource Locator (URL) input by a user is received;
when an instruction for adding the URL is received, storing the URL into a preset offline browsing list, downloading a webpage resource file of a webpage corresponding to the URL into a specified storage position, and compressing the downloaded webpage resource file into an executable document; and
in an offline state, the URL in the offline browsing list is selected and the executable document corresponding to the URL is loaded so as to implement offline webpage browsing.

The present disclosure further provides a device for offline webpage browsing, including:
a reception unit configured to receive a Uniform Resource Locator (URL) input by a user;
a downloading unit configured to: when an instruction for adding the URL is received from the user, store the URL into a preset offline browsing list, download a webpage resource file of a webpage corresponding to the URL into a specified storage position, and compress the downloaded webpage resource file into an executable document; and
an offline loading unit configured to select, in an offline state, the URL in the offline browsing list and load the executable document corresponding to the URL so as to implement offline webpage browsing.

Yet another embodiment of the disclosure provides a computer storage medium with computer readable instructions for implementing the offline webpage browsing method according to the embodiments of the disclosure.

It can be seen from the above technical solutions, a desired webpage resource file is download in advance and compressed into an executable document. In an offline (network-disconnected) state, the executable document is loaded so as to implement offline webpage browsing. Since a downloaded webpage resource file is compressed into an executable document, problems, such as a waste of storage space due to an existing dispersive storage of a webpage resource file and a low-efficiency loading may be effectively avoided. Moreover, the embodiments of the disclosure directly load the executable document instead of loading each of dispersive webpage resource files, thus avoiding effectively a problem of an uncompleted loading of a webpage resource file.

BRIEF DESCRIPTION OF THE DRAWINGS

The present disclosure will be explained in detail with reference to the accompanying drawings. Although the drawings described below are intended for specific embodiments of the disclosure, modifications or changes to these drawings are also possible.

DETAILED DESCRIPTION

In order to make objectives, technical solutions and advantages of the disclosure more clear, the disclosure will be further elaborated below in combination with the accompanying drawings and embodiments. It should be understood that the specific embodiments are only used to interpret the disclosure instead of limiting the disclosure.

In order to explain the technical solutions of the disclosure, specific embodiments will be explained below.

Embodiment 1

Figure 1:
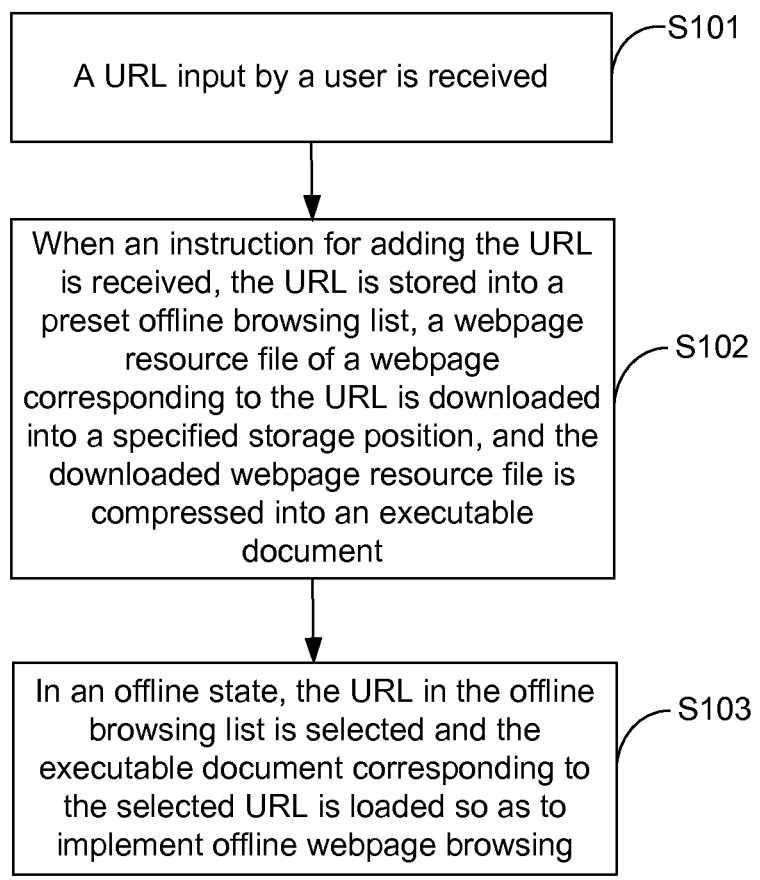
FIG. 1 is a flow chart of an offline webpage browsing method provided by a first embodiment of the disclosure.

FIG. 1 shows a flow chart of an offline webpage browsing method provided by a first embodiment of the disclosure, the method is elaborated as follows.

In step S101, a Uniform Resource Locator (URL) input by a user is received.

In the embodiment, an IOS-platform-based terminal device receives, in an online (network-connected) state, a URL input by a user through a browser (e.g., a QQ browser) of the terminal device.

In step S102, when a user's instruction of adding the URL is received, the URL is stored into a preset offline browsing list, a webpage resource file of a webpage corresponding to the URL is downloaded into a specified storage position, and a downloaded webpage resource file is compressed into an executable document.

In the embodiment, in order to facilitate a user to select, in an offline state, a webpage which he desires to browse, an offline browsing list is set in advance, when the user's instruction of adding a URL is received, the current URL is stored into the offline browsing list, and a webpage resource file of a webpage corresponding to the URL is downloaded. It should be noted that when a URL is stored, the URL needs to be converted to a corresponding webpage name, which will be displayed in the offline browsing list.

Preferably, in order to avoid an uncompleted loading of a webpage resource file, a waste of storage space due to a scattered distribution of stored webpage resource files and an influence on the efficiency of subsequent loadings, the embodiment downloads a webpage resource file of a webpage corresponding to the URL into a specified storage position, and compresses a downloaded webpage resource file into an executable document. The contents of the same webpage are stored into the same position, such as the same folder.

It should be noted that offline browsing of most existing Personal Computers (PCs) stores dispersively downloaded webpage resource files, and one webpage may include dozens of resource files such as hyper text markup language (html), images and the like, if stored dispersively, an excess of small files results readily in the decline of the usage rate of a disk space, decreases the efficiency of a subsequent UIWebView loading, and may result in an incomplete loading or non-loading of some webpage resource files.

Preferably, in order to avoid that there are too many URLs stored in an offline browsing list and it is not convenient for a user to look up, the embodiment may further perform a setting, deletion and sorting operation on URLs in the offline browsing list. It should be noted that when a deletion operation is performed on a URL, it is desired to delete the executable document corresponding to the URL.

In step S103, in an offline state, a user-selected URL from the offline browsing list is received and the stored executable document corresponding to the user-selected URL is loaded so as to implement offline webpage browsing.

Preferably, the executable document stored corresponding to the user-selected URL is loaded by a UIWebView control.

In the embodiment, the UIWebView control is a control of an IOS-platform-based terminal device. In an offline state, a user-selected URL or a corresponding webpage name of the URL from the offline browsing list is received, and an executable document corresponding to a user-selected URL at the specified storage position is loaded through a privately-owned interface of the UIWebView control.

Since a downloaded webpage resource file is compressed into an executable document, problems, such as a waste of storage space due to an existing dispersive storage of a webpage resource file and a low-efficiency loading may be effectively avoided. Moreover, the embodiment of the disclosure directly loads the executable document by a UIWebView, so the executable document includes all webpage resource files, thus being able to solve effectively the problem existing in the prior art that an incompletely loading of some webpage resource files occurs when all dispersive webpage resource files are loaded.

Embodiment 2

Figure 2:
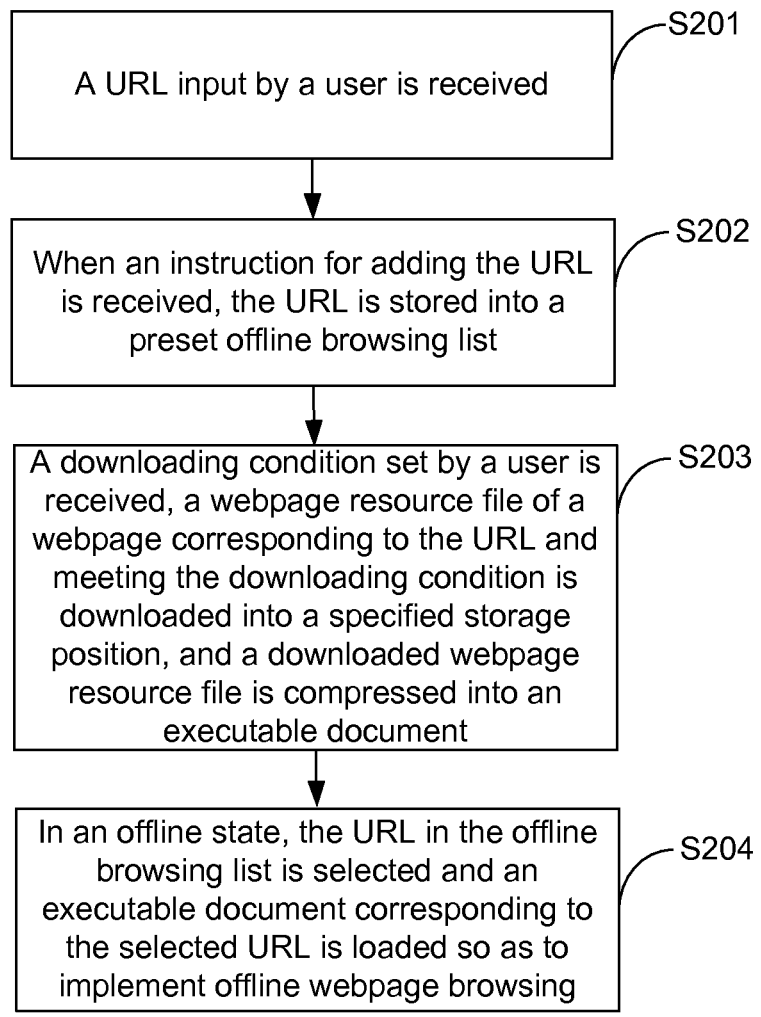
FIG. 2 is a flow chart of an offline webpage browsing method provided by a second embodiment of the disclosure.

FIG. 2 shows a flow chart of an offline webpage browsing method provided by a second embodiment of the disclosure, the method is elaborated as follows.

In Step S201, a URL input by a user is received.

The specific implementation of this step is described as the step S101 in embodiment 1, and the detailed description thereof will be omitted.

In step S201, when a user's instruction of adding the URL is received, the URL is stored into a preset offline browsing list.

In step S203, a downloading condition set by a user is received, a webpage resource file of a webpage corresponding to the URL and meeting the downloading condition is downloaded into a specified storage position, and a downloaded webpage resource file is compressed into an executable document.

In the embodiment, the downloading condition includes but is not limited to at least one of: a file type, file size and a specified number of layers of a webpage. The file type includes: html, txt, pdf, doc, jpg, bmp, gif, png, mpg, mp2, mp3, avi, wav, mid, exe, zip and the like. In practical applications, an interface for setting the downloading condition may be displayed so that a user selects a desirable type, limits the size of a file to be downloaded (e.g., smaller than 100 M) and specifies the number of layers of a webpage.

Preferably, in order to facilitate a user to know the downloading status in time, the downloading process is controlled, for example, the downloading is terminated when the downloading is slow. The embodiment further includes: a download progress is indicated when a webpage resource file is being downloaded, for example, the download progress is indicated by a progress bar.

In step S204, in an offline state, a URL from the offline browsing list is selected and an executable document corresponding to the selected URL is loaded so as to implement offline webpage browsing.

Preferably, the executable document corresponding to the user-selected URL is loaded by a UIWebView control.

The specific implementation of this step is described as the step S103 in embodiment 1, and the detailed description thereof will be omitted.

The embodiment may save effectively the download traffic and download time and improve download efficiency by setting in advance a downloading condition and downloading only webpage resource files meeting the downloading condition.

Embodiment 3

Figure 3:
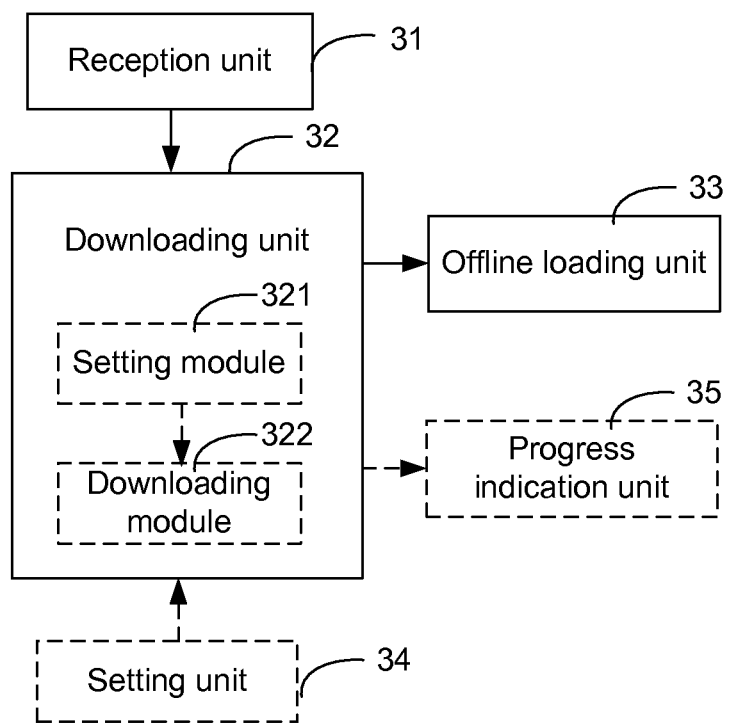
FIG. 3 is a structure diagram of an offline webpage browsing device provided by a third embodiment of the disclosure.

FIG. 3 shows a structure diagram of an offline webpage browsing device provided by a third embodiment of the disclosure, for a expositional convenience, only portions related to the embodiment of the disclosure are shown.

The offline webpage browsing device may be a software unit, hardware unit or combination of a software unit and a hardware unit operating in a terminal device (e.g., iPhone, ipad and the like), and may also be an independent widget integrated into an application system of the terminal device.

The offline webpage browsing device includes a reception unit 31, a downloading unit 32 and an offline loading unit 33. The function of each unit is provided as follows.

The reception unit configured to receive a URL input by a user;

The downloading unit 32 is configured to: when a user's instruction of adding the URL is received, store the URL into a preset offline browsing list, download a webpage resource file of a webpage corresponding to the URL into a specified storage position, and compress a downloaded webpage resource file into an executable document; and The offline loading unit 33 is configured to select, in an offline state, a URL from the offline browsing list and load an executable document corresponding to the user-selected URL so as to implement offline webpage browsing.

Further, the offline loading unit 33 may load the executable document corresponding to the user-selected URL by a UIWebView control.

Further, the device further includes a setting unit 34 configured to prioritize, delete or sort URLs in the offline browsing list.

Further, the downloading unit 32 further includes:

a setting module 321 configured to set a downloading condition; and a downloading module 322 configured to download a webpage resource file corresponding to the URL and meeting a downloading condition set by the setting module 321 into the specified storage position.

The device further includes:

a progress indication unit 35 configured to indicate a download progress when the webpage resource file is being downloaded.

In the embodiment, the downloading condition includes but is not limited to at least one of: a file type, file size and a specified number of layers of a webpage.

The offline webpage browsing device may use the corresponding offline webpage browsing method described above, for the details, refer to the related description in embodiment 1 and embodiment 2 of the offline webpage browsing method, and detailed description thereof will be omitted.

It will be appreciated by those skilled in the art that all units and modules included in embodiment 3 are divided based on their functions but are not limited to the division as long as corresponding functions can be implemented; in addition, the specific name of each unit or module is only used to facilitate distinction between each other instead of limiting the scope of protection of the disclosure.

To sum up, the embodiments of the disclosure download in advance a desirable webpage resource file and compress a downloaded webpage resource file into an executable document. In an offline (network-disconnected) state, the executable document is loaded by the UIWebView control so as to implement offline webpage browsing. Since a downloaded webpage resource file is compressed into an executable document, problems, such as a waste of storage space due to an existing dispersive storage of a webpage resource file and a low-efficiency loading may be effectively avoided. Moreover, the embodiments of the disclosure directly load the executable document by the UIWebView instead of loading each of dispersive webpage resource files, thus avoiding effectively a problem of an uncompleted loading of a webpage resource file resulted from the uncontrollability of the UIWebView. In addition, the embodiment may save effectively the download traffic and download time and improve download efficiency by setting in advance a downloading condition and downloading only webpage resource files meeting the downloading condition. The embodiments of the disclosure have advantages of simple implementation, ease of use and strong practicability.

Those skilled in the art will appreciate that all or part of the steps in the method according to the above embodiments may be implemented by related hardwares instructed by a program, which is stored in a computer readable storage medium, such as an ROM/RAM, magnetic disk, optical disk and the like. Therefore, the embodiments of the disclosure further provide a computer storage medium with computer readable instructions stored thereon for implementing the offline webpage browsing method according to the embodiments of the disclosure.

Described are merely preferable embodiments of the disclosure, and are not intended to limit the disclosure. All modifications, replacements and improvements made within the principles of the disclosure should be included within the scope of the disclosure.

The invention claimed is:

1. A method for offline webpage browsing, applied in a terminal device and comprising:

receiving, in an online state, a Uniform Resource Locator (URL) input by a user through a browser of the terminal device;

when an instruction for adding the URL is received from the user, converting the URL to a corresponding webpage name, storing the corresponding webpage name of the URL into a preset offline browsing list, downloading a webpage resource file of a webpage corresponding to the URL into a specified storage position by accessing a server, and compressing the downloaded webpage resource file into an executable document, contents of a same webpage being stored into a same position;

selecting, in an offline state, the corresponding webpage name of the URL in the offline browsing list, and loading the executable document corresponding to the URL at the specified storage position by a UIWebView control, wherein the UIWebView control is a control of an IOS-platform-based terminal device; and performing the executable document to implement offline webpage browsing;

wherein the method further comprises:

prioritizing URLs in the offline browsing list; and deleting the URLs in the offline browsing list, wherein when each of the URLs in the offline browsing list is deleted, the executable document corresponding to the URL is deleted.

2. The method according to claim 1, further comprising: sorting the URLs in the offline browsing list.

3. The method according to claim 1, wherein the step of downloading a webpage resource file of a webpage corresponding to the URL into a specified storage position comprises:

setting a downloading condition; and downloading a webpage resource file corresponding to the URL and meeting the downloading condition into the specified storage position.

4. The method according to claim 3, wherein the downloading condition comprises at least one of: a file type, file size and a specified number of layers of a webpage.

5. The method according to claim 1, further comprising: indicating a download progress when the webpage resource file is being downloaded.

6. A device for offline webpage browsing, the device is operated in a terminal device and comprises:

a memory storing computer-executable instructions; and one or more processors executing the computer-executable instructions to implement a plurality of program units, wherein the plurality of program units comprises:

a reception unit configured to receive, in an online state, a Uniform Resource Locator (URL) input by a user through a browser of the terminal device;

a downloading unit configured to: when an instruction for adding the URL is received from the user, converting the URL to a corresponding webpage name, store the corresponding webpage name of the URL into a preset offline browsing list, download a webpage resource file of a webpage corresponding to the URL into a specified storage position by accessing a server, and compress the downloaded webpage resource file into an executable document, contents of a same webpage being stored into a same position;

an offline loading unit configured to select, in an offline state, the corresponding webpage name of the URL in the offline browsing list, load the executable document corresponding to the URL at the specified storage position by a UIWebView control and perform the executable document to implement offline webpage browsing, wherein the UIWebView control is a control of an IOS-platform-based terminal device; and a setting unit configured to prioritize URLs in the offline browsing list and delete the URLs in the offline browsing list, wherein when each of the URLs in the offline browsing list is deleted, the executable document corresponding to the URL is deleted.

7. The device according to claim 6, the setting unit is further configured to sort the URLs in the offline browsing list.

8. The device according to claim 6, wherein the downloading unit further comprises:
   a setting module configured to set a downloading condition; and
   a downloading module configured to download a webpage resource file corresponding to the URL and meeting a downloading condition set by the setting module into the specified storage position.

9. The device according to claim 8, wherein the downloading condition comprises at least one of: a file type, file size and a specified number of layers of a webpage.

10. The device according to claim 6, the plurality of program units further comprises:
    a progress indication unit configured to indicate a download progress when the webpage resource file is being downloaded.

11. A non-transitory computer-readable storage medium with computer-executable instructions stored thereon, the computer-executable instructions are executed for:
    receiving, in an online state, a Uniform Resource Locator (URL) input by a user through a browser of a terminal device;
    when an instruction for adding the URL is received from the user, converting the URL to a corresponding webpage name, storing the corresponding webpage name of the URL into a preset offline browsing list, downloading a webpage resource file of a webpage corresponding to the URL into a specified storage position by accessing a server, and compressing the downloaded webpage resource file into an executable document, contents of a same webpage being stored into a same position;
    selecting, in an offline state, the corresponding webpage name of the URL in the offline browsing list, and loading the executable document corresponding to the URL at the specified storage position by a UIWebView control, wherein the UIWebView control is a control of an IOS-platform-based terminal device; and
    performing the executable document to implement offline webpage browsing;
    wherein the computer-executable instructions are further executable for prioritizing URLs in the offline browsing list and deleting the URLs in the offline browsing list, wherein when each of the URLs in the offline browsing list is deleted, the executable document corresponding to the URL is deleted.

12. The non-transitory computer-readable storage medium according to claim 11, the computer-executable instructions are further executable for:
    sorting URLs in the offline browsing list.

13. The non-transitory computer-readable storage medium according to claim 11, the computer-executable instructions are executable for:
    setting a downloading condition; and
    downloading a webpage resource file corresponding to the URL and meeting the downloading condition into the specified storage position.

14. The non-transitory computer-readable storage medium according to claim 13, wherein the downloading condition comprises at least one of: a file type, file size and a specified number of layers of a webpage.

15. The non-transitory computer-readable storage medium according to claim 11, the computer-executable instructions are executable for:
    indicating a download progress when the webpage resource file is being downloaded.

* * * * *